(12) United States Patent
Uenaka

(10) Patent No.: US 7,590,338 B2
(45) Date of Patent: Sep. 15, 2009

(54) ANTI-SHAKE APPARATUS

(75) Inventor: Yukio Uenaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 255 days.

(21) Appl. No.: 11/737,935

(22) Filed: Apr. 20, 2007

(65) Prior Publication Data

US 2007/0269195 A1 Nov. 22, 2007

(30) Foreign Application Priority Data

May 19, 2006 (JP) ............................. 2006-140536

(51) Int. Cl.
G03B 17/00 (2006.01)
H04N 5/228 (2006.01)

(52) U.S. Cl. .................................... 396/55; 348/208.99

(58) Field of Classification Search .................. 396/55, 396/52, 53, 263, 265, 266, 301, 302; 348/208.99, 348/208.4, 208.12, 208.16

See application file for complete search history.

(56) References Cited

U.S. PATENT DOCUMENTS

| 5,576,787 A | 11/1996 | Kai et al. |
| 5,640,611 A | 6/1997 | Kai et al. |
| 5,752,091 A | 5/1998 | Kai et al. |
| 5,953,544 A | 9/1999 | Kai et al. |
| 6,343,187 B1 * | 1/2002 | Sato ........................... 396/52 |

FOREIGN PATENT DOCUMENTS

| JP | 6-160952 | 6/1994 |
| JP | 2007049407 A | * 2/2007 |

OTHER PUBLICATIONS

JP-2007-049407 A Machine Translation (JPO Website).*

* cited by examiner

*Primary Examiner*—W B Perkey
*Assistant Examiner*—Minh Q Phan
(74) *Attorney, Agent, or Firm*—Greenblum & Bernstein P.L.C.

(57) ABSTRACT

An anti-shake apparatus of a photographing apparatus comprises a photometric switch for a photometric operation, a release switch for a photographing operation, and a controller. The controller performs the photographing operation without an anti-shake operation when the release switch is set to the ON state and when it is determined that either a first elapsed time from the point when the main power supply is set to the ON state is not greater than a first time, or a second elapsed time from the point when the photometric switch is set to the ON state for the photometric operation is not greater than a second time.

6 Claims, 10 Drawing Sheets

ANTI-SHAKE APPARATUS

BACKGROUND OF THE INVENTION

1. Field of the Invention

The present invention relates to an anti-shake apparatus for a photographing apparatus, and in particular to an operating control for a period when the anti-shake operation cannot be performed accurately.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. H06-160952 discloses an apparatus that restricts the photographing operation in a period when the anti-shake operation cannot be performed accurately, such as a predetermined time period after the main power supply is set to the ON state.

However, because the photographing operation is restricted during the period when the anti-shake operation cannot be performed accurately, the photographing apparatus cannot be used sufficiently because the photographing operation cannot be executed immediately after the main power supply is set to the ON state.

SUMMARY OF THE INVENTION

Therefore, an object of the present invention is to provide an apparatus that can perform the photographing operation immediately after the main power supply is set to the ON state, even if the anti-shake operation cannot be performed accurately.

According to the present invention, an anti-shake apparatus of a photographing apparatus comprises a photometric switch for a photometric operation, a release switch for a photographing operation, and a controller. The controller performs the photographing operation without an anti-shake operation when the release switch is set to the ON state and when it is determined that either a first elapsed time from the point when the main power supply is set to the ON state is not greater than a first time, or a second elapsed time from the point when the photometric switch is set to the ON state for the photometric operation is not greater than a second time.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
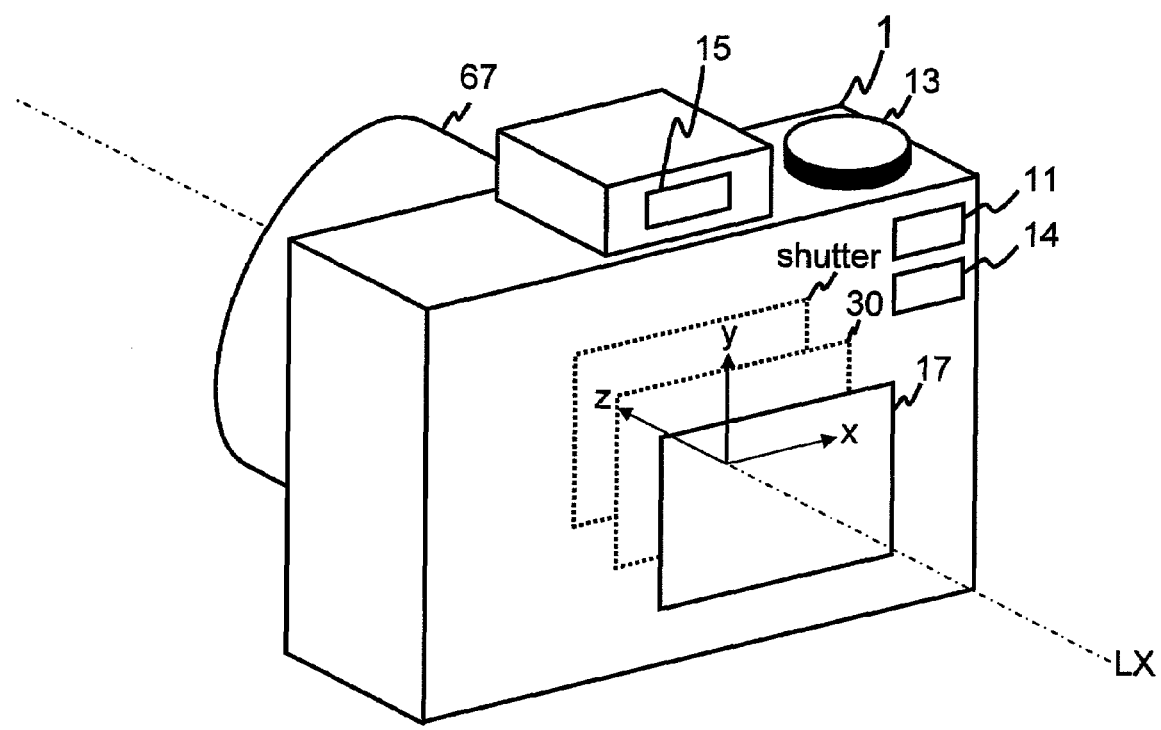
FIG. 1 is a perspective view of an embodiment of the photographing apparatus viewed from the back side.

The present invention is described below with reference to the embodiment shown in the drawings. In this embodiment, the photographing apparatus 1 is a digital camera. A camera lens 67 of the photographing apparatus 1 has an optical axis LX.

In order to explain the direction in this embodiment, a first direction x, a second direction y, and a third direction z are defined (see FIG. 1). The first direction x is a direction which is perpendicular to the optical axis LX. The second direction y is a direction which is perpendicular to the optical axis LX and the first direction x. The third direction z is a direction which is parallel to the optical axis LX and perpendicular to both the first direction x and the second direction y.

Figure 2:
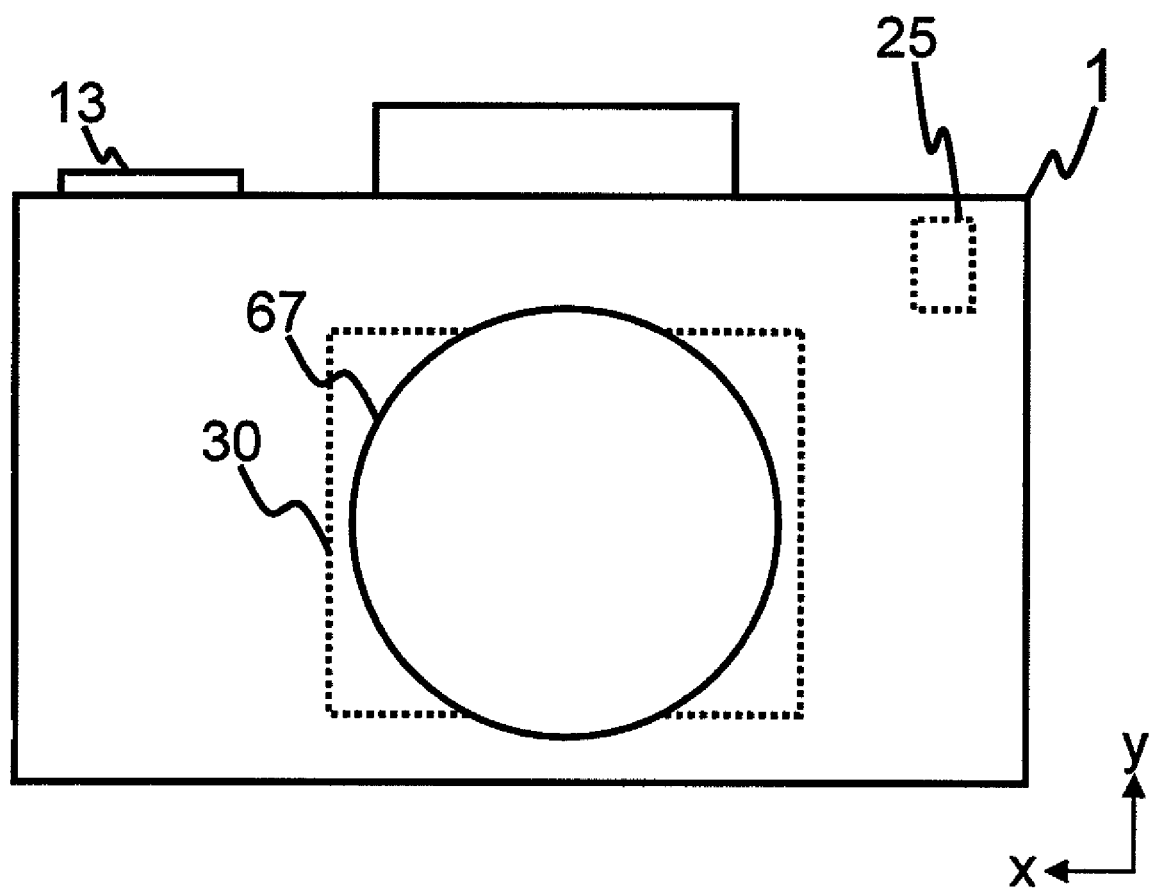
FIG. 2 is a front view of the photographing apparatus.
Figure 3:
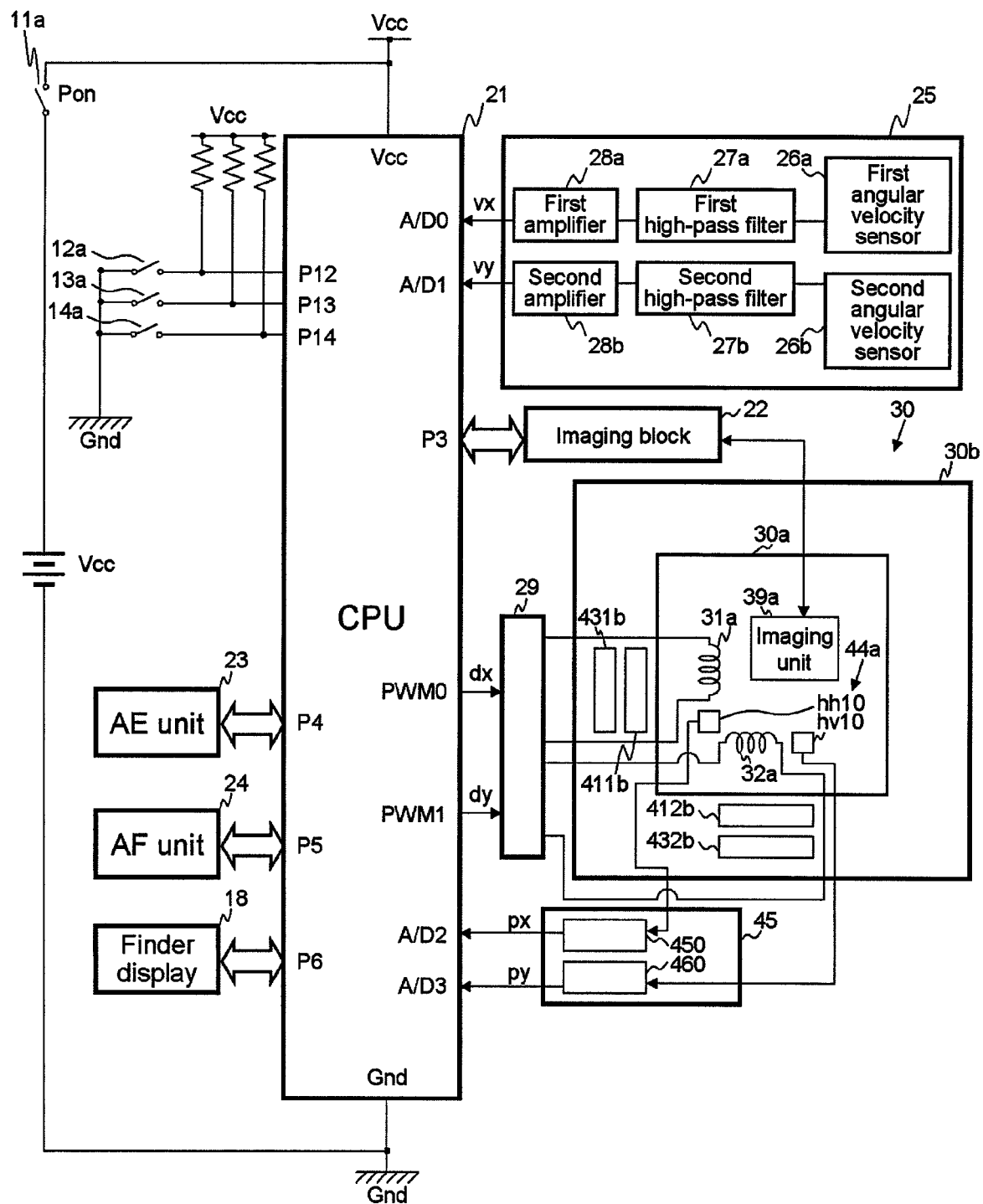
FIG. 3 is a circuit construction diagram of the photographing apparatus.

The imaging part of the photographing apparatus 1 comprises a PON button 11, a PON switch 11a, a photometric switch 12a, a release button 13, a release switch 13a, an anti-shake button 14, an anti-shake switch 14a, an optical finder 15, an indicating unit 17 such as an LCD monitor etc., a finder display 18, a CPU 21, an imaging block 22, an AE (automatic exposure) unit 23, an AF (automatic focus) unit 24, an imaging unit 39a in the anti-shake apparatus 30, and a camera lens 67 (see FIGS. 1, 2, and 3).

Whether the PON switch 11a is in the ON state or the OFF state, is determined by the state of the PON button 11, so that the ON/OFF states of the photographing apparatus 1 correspond to the ON/OFF states of the PON switch 11a.

The photographic subject image is captured as an optical image through the camera lens 67 by the imaging block 22, which drives the imaging unit 39a so that the image, which is captured, is displayed on the indicating unit 17. The photographic subject image can be optically observed by the optical finder 15.

When the release button 13 is partially depressed by the operator, the photometric switch 12a changes to the ON state so that the photometric operation, the AF sensing operation, and the focusing operation are performed.

When the release button 13 is fully depressed by the operator, the release switch 13a changes to the ON state so that the imaging operation is performed, and the image, which is captured, is stored.

Figure 4:
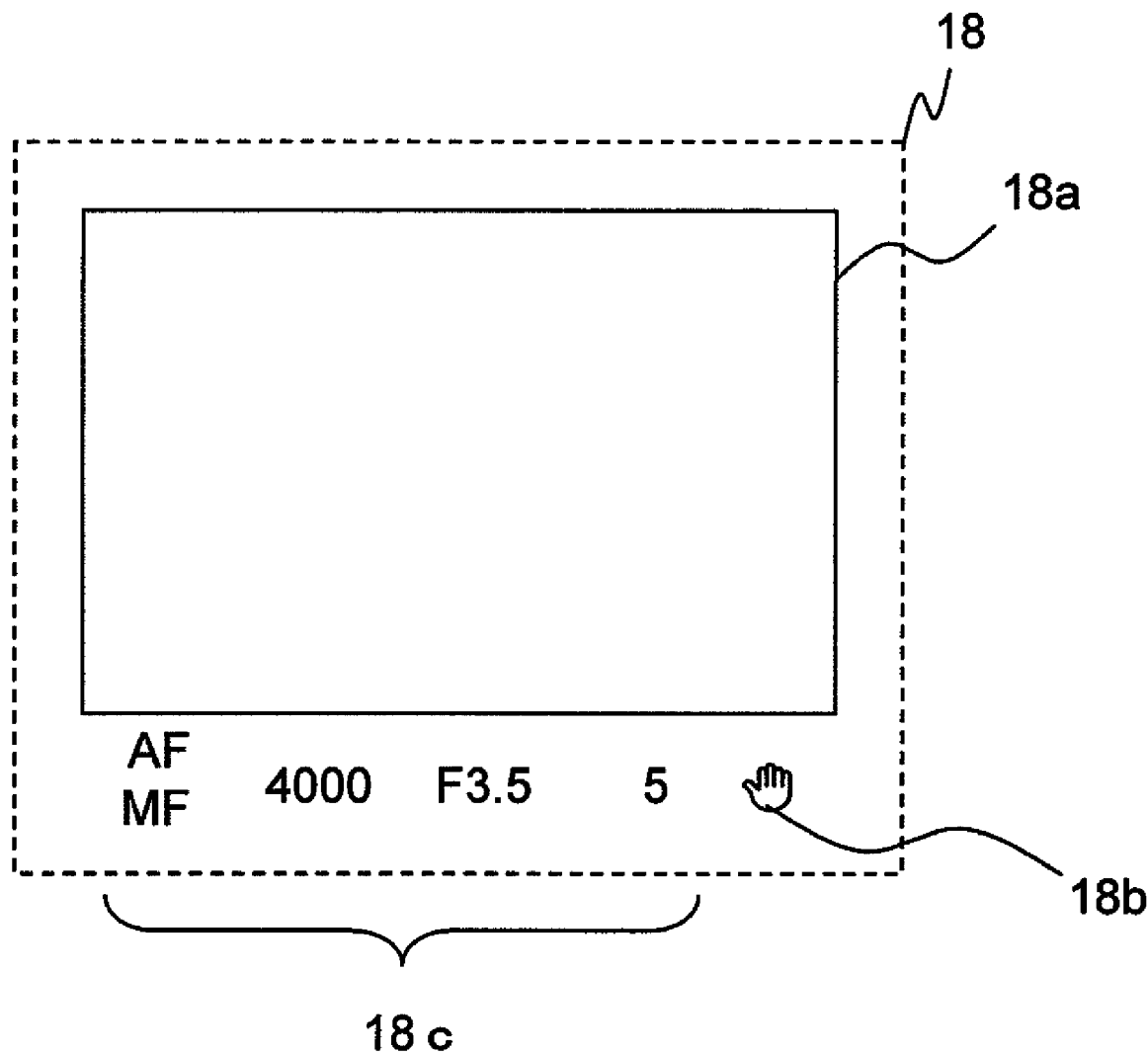
FIG. 4 is a construction figure of the finder display.

The finder display 18 is connected to port P6, and is indicated in the optical finder 15. The finder display 18 has a photographing subject display area 18a, an anti-shake operation state display area 18b, and a photographing operation state display area 18c (see FIG. 4).

The photographing subject display area 18a is an indicating area upon which the photographing subject is projected.

The anti-shake operation state display area 18b is an indicating area upon which the symbol of a human hand (the anti-shake operation state display mark) is displayed in the ON state, but not displayed in the OFF state, to indicate whether or not the anti-shake operation is in effect. When an anti-shake parameter IS is set to 1, the anti-shake operation is in effect and the anti-shake operation state display mark is indicated. When the anti-shake parameter IS is set to 0, the anti-shake operation is not in effect and the anti-shake operation state display mark is not indicated.

The photographing operation state display area 18c is an indicating area upon which various settings of the operating state of the photographing apparatus 1, such as shutter speed, aperture value, etc., are indicated.

In this embodiment, the anti-shake operation state display mark is indicated on the finder display 18 in the optical finder 15, however, it may also be indicated on the indicating unit 17. Further, whether the anti-shake operation state is ON state or OFF state may be announced by sound.

The CPU 21 is a control apparatus, which controls each part of the photographing apparatus 1 regarding the imaging operation, and controls each part of the photographing apparatus 1 regarding the anti-shake operation. The anti-shake operation controls both the movement of the movable unit 30a and position detecting efforts.

Further, the CPU 21 stores a value of the anti-shake parameter IS that determines whether the photographing apparatus 1 is in the anti-shake mode or not.

The CPU 21 monitors the value of a first elapsed time counter TON that measures a first elapsed time as the time from the point when the PON switch is set to the ON state (the main power supply of the photographing apparatus 1 is set to the ON state).

The CPU 21 also monitors the value of a second elapsed time counter TCL that measures a second elapsed time as the time from the point when the photometric switch 12a is set to the ON state.

Until the value of the first elapsed time counter TON and the value of the second elapsed time counter TCL exceed a first time T1 and a second time T2, respectively, the photographing operation is performed without the anti-shake operation when the release switch 13a is set to the ON state (the anti-shake parameter IS=0), even if the anti-shake switch 14a is in the ON state.

In other words, as long as at least either the value of the first elapsed time counter TON has not become greater than the first time T1, or the value of the second elapsed time counter TCL has not become greater than the second time T2, even if the anti-shake switch 14a is in the ON state, the photographing operation is performed without the anti-shake operation when the release switch 13a is set to the ON state (the anti-shake parameter IS=0).

The CPU 21 temporally stores the value of the first elapsed time counter TON and the value of the second elapsed time counter TCL.

The CPU 21 determines whether the release switch 13a is set to the ON state or not. When the release switch 13a is set to the ON state, the CPU 21 sets the value of a release SW parameter rp to 1. When the release switch 13a is set to the OFF state, the CPU 21 sets the value of the release SW parameter rp to 0. The CPU 21 temporally stores the value of the release SW parameter rp.

The imaging block 22 drives the imaging unit 39a. The AE unit 23 performs the photometric operation and calculates the photometric values, based on the subject being photographed. The AE unit 23 also calculates the aperture value and the time length of the exposure corresponding to the photometric values, both of which are needed for imaging. The AF unit 24 performs the AF sensing operation and the corresponding focusing operation, both of which are needed for imaging. In the focusing operation, the camera lens 67 is re-positioned along the optical axis in the LX direction.

The anti-shaking part of the photographing apparatus 1 comprises an anti-shake button 14, an anti-shake switch 14a, a finder display 18, a CPU 21, an angular velocity detection unit 25, a driver circuit 29, an anti-shake apparatus 30, a hall-element signal-processing unit 45 (a magnetic-field change-detecting element), and the camera lens 67.

When the anti-shake button 14 is depressed by the operator, the anti-shake switch 14a is changed to the ON state, so that the anti-shake operation is performed, where the angular velocity detection unit 25 and the anti-shake apparatus 30 are driven at every predetermined time interval, independent of the other operations which include the photometric operation etc. When the anti-shake switch 14a is in the ON state, in other words in the anti-shake mode, the anti-shake parameter IS is set to 1 (IS=1). When the anti-shake switch 14a is not in the ON state, in other words in the non-anti-shake mode, the anti-shake parameter IS is set to 0 (IS=0). In this embodiment, the predetermined time interval is 1 ms.

However, until the value of the first elapsed time counter TON and the second elapsed time counter TCL exceed the first time T1 and the second time T2 respectively, even if the anti-shake switch 14a is in the ON state, the value of the anti-shake parameter IS is set to 0.

The various output commands corresponding to the input signals of these switches are controlled by the CPU 21.

The information regarding whether the photometric switch 12a is in the ON state or OFF state is input to port P12 of the CPU 21 as a 1-bit digital signal. The information regarding whether the release switch 13a is in the ON state or OFF state is input to port P13 of the CPU 21 as a 1-bit digital signal. The information regarding whether the anti-shake switch 14a is in the ON state or OFF state is input to port P14 of the CPU 21 as a 1-bit digital signal.

The imaging block 22 is connected to port P3 of the CPU 21 for inputting and outputting signals. The AE unit 23 is connected to port P4 of the CPU 21 for inputting and outputting signals. The AF unit 24 is connected to port P5 of the CPU 21 for inputting and outputting signals. The finder display 18 is connected to port P6 of the CPU 21 for inputting and outputting signals.

Next, the details of the input and output relationship between the CPU 21 and the angular velocity detection unit 25, the driver circuit 29, the anti-shake apparatus 30, and the hall-element signal-processing unit 45 is explained.

The angular velocity detection unit 25 has a first angular velocity sensor 26a, a second angular velocity sensor 26b, a first high-pass filter circuit 27a, a second high-pass filter circuit 27b, a first amplifier 28a and a second amplifier 28b.

The first angular velocity sensor 26a detects the angular velocity of a rotary motion (the yawing) of the photographing apparatus 1 about the axis of the second direction y (the velocity-component in the first direction x of the angular velocity of the photographing apparatus 1), at every predetermined time interval (1 ms). The first angular velocity sensor 26a is a gyro sensor that detects a yawing angular velocity.

The second angular velocity sensor 26b detects the angular velocity of a rotary motion (the pitching) of the photographing apparatus 1 about the axis of the first direction x (detects the velocity-component in the second direction y of the angular velocity of the photographing apparatus 1), at every predetermined time interval (1 ms) The second angular velocity sensor 26b is a gyro sensor that detects a pitching angular velocity.

The first high-pass filter circuit 27a reduces a low frequency component of the signal output from the first angular velocity sensor 26a, because the low frequency component of the signal output from the first angular velocity sensor 26a includes a signal based on a null voltage and a panning-motion, neither of which are related to hand-shake.

The second high-pass filter circuit 27b reduces a low frequency component of the signal output from the first angular velocity sensor 26b, because the low frequency component of the signal output from the first angular velocity sensor 26b includes a signal based on a null voltage and a panning-motion, neither of which are related to hand-shake.

The first amplifier 28a amplifies a signal regarding the yawing angular velocity, whose low frequency component has been reduced, and outputs the analog signal to the A/D converter A/D 0 of the CPU 21 as a first angular velocity vx.

The second amplifier 28b amplifies a signal regarding the pitching angular velocity, whose low frequency component has been reduced, and outputs the analog signal to the A/D converter A/D 1 of the CPU 21 as a second angular velocity vy.

The supply of electric power to the CPU 21 and each part of the angular velocity detection unit 25 begins after the PON switch 11a is set to the ON state (the main power supply is set to the ON state). The calculation of a hand-shake quantity begins after the photometric switch 12a is set to the ON state.

Figure 5:
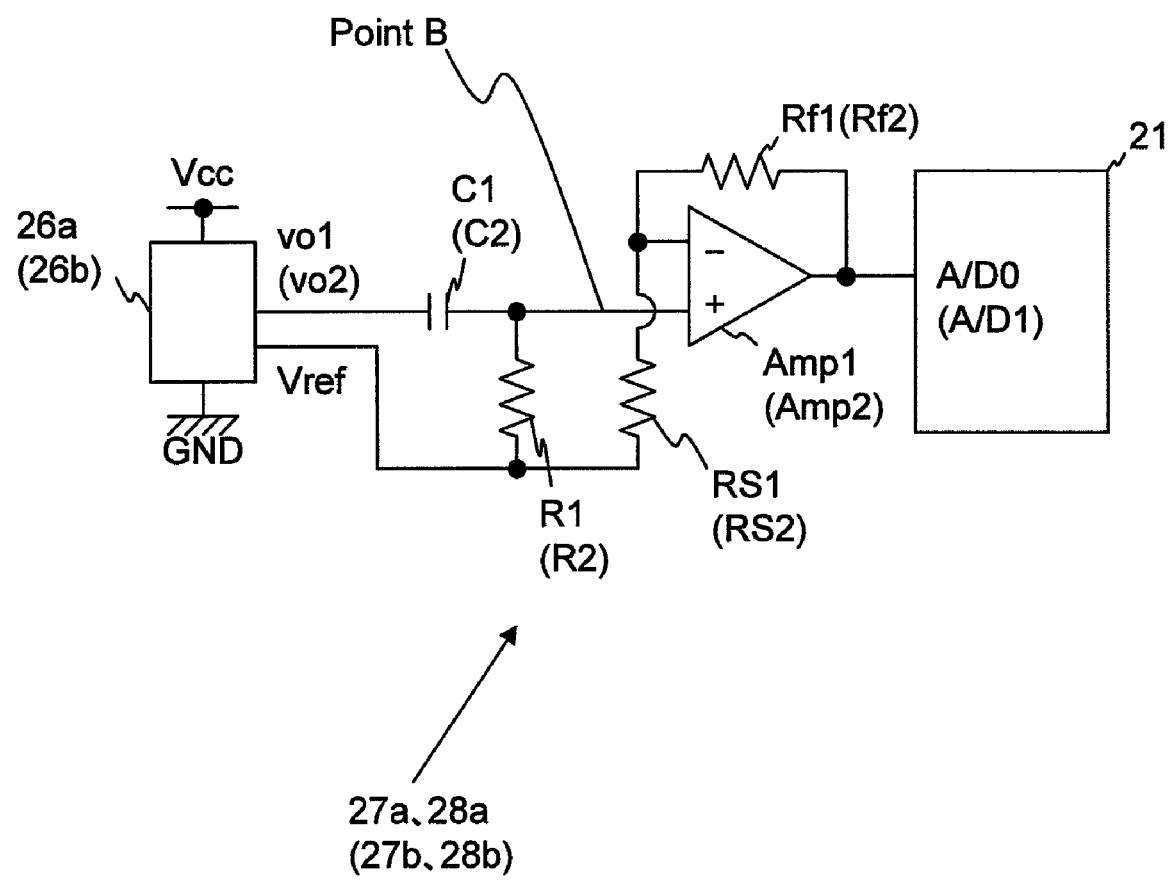
FIG. 5 is a circuit construction diagram of the angular velocity sensors, the high-pass filter circuits, and the amplifiers.

The first high-pass filter circuit 27a and the first amplifier 28a have three resistors R1, RS1, and Rf1, a condenser C1, and an operational amplifier Amp1 (see FIG. 5).

One terminal of the condenser C1 is connected to a terminal vo1 of the first angular velocity sensor 26a that outputs information regarding the yawing angular velocity. The other terminal of the condenser C1 is connected to one terminal of the resistor R1 and a non-inverting input terminal of the operational amplifier Amp1. The other terminal of the resistor R1 is connected to one terminal of the resistor RS1 and a terminal Vref of the first angular velocity sensor 26a that outputs a reference voltage Vref for detecting the hand-shake quantity. The other terminal of the resistor RS1 is connected to an inverting input terminal of the operational amplifier Amp1 and one terminal of the resistor Rf1. An output terminal of the operational amplifier Amp1 is connected to the other terminal of the resistor Rf1 and the A/D converter A/D 0 of the CPU 21, and outputs the first angular velocity vx.

The second high-pass filter circuit 27b and the second amplifier 28b have three resistors R2, RS2, and Rf2, a condenser C2, and an operational amplifier Amp2.

One terminal of the condenser C2 is connected to a terminal vo2 of the second angular velocity sensor 26b that outputs information regarding the pitching angular velocity. The other terminal of the condenser C2 is connected to one terminal of the resistor R2 and a non-inverting input terminal of the operational amplifier Amp2. The other terminal of the resistor R2 is connected to one terminal of the resistor RS2 and a terminal Vref of the second angular velocity sensor 26b that outputs a reference voltage Vref for detecting the hand-shake quantity. The other terminal of the resistor RS2 is connected to an inverting input terminal of the operational amplifier Amp2 and one terminal of the resistor Rf2. An output terminal of the operational amplifier Amp2 is connected to the other terminal of the resistor Rf2 and the A/D converter A/D 1 of the CPU 21, and outputs the second angular velocity vy.

The CPU 21 converts the first angular velocity vx which is input to the A/D converter. A/D 0 and the second angular velocity vy which is input to the A/D converter A/D 1 to digital signals (A/D conversion operation), and calculates the hand-shake quantity, which occurs in the predetermined time (1 ms), on the basis of the converted digital signals and the conversion coefficient, of which focal distance is considered. Accordingly, the CPU 21 and the angular velocity detection unit 25 use a function to calculate the hand-shake quantity.

The CPU 21 calculates the position S where the imaging unit 39a (the movable unit 30a) should be moved, corresponding to the hand-shake quantity which is calculated for the first direction x and the second direction y.

The coordinate of position S in the first direction x is defined as sx, and the coordinate of position S in the second direction y is defined as sy. The movement of the movable unit 30a, which includes the imaging unit 39a, is performed by using electro-magnetic force and is described later. The driving force D, which drives the driver circuit 29 in order to move the movable unit 30a to the position S, has a first PWM duty dx as the driving-force component in the first direction x, and a second PWM duty dy as the driving-force component in the second direction y.

The anti-shake apparatus 30 is an apparatus which corrects for the hand-shake effect when the release switch 13a is set to the ON state in the photographing operation by moving the imaging unit 39a to the position S, by canceling the lag of the photographing subject image on the imaging surface of the imaging device of the imaging unit 39a, and by stabilizing the photographing subject image that reaches the imaging surface of the imaging device.

The anti-shake apparatus 30 has a fixed unit 30b, and a movable unit 30a which includes the imaging unit 39a and can be moved about on the xy plane. Or, the anti-shake apparatus 30 is composed of a driving part which uses an electro-magnetic force to move the movable unit 30a to the position S, and a position-detecting part which detects the position of the movable unit 30a (a detected-position P).

The size and the direction of the electro-magnetic force are determined by the size and the direction of the current which flows through a coil unit for driving, and the size and the direction of the magnetic-field of a magnet unit for driving.

In the photographing operation, when the release switch 13a is set to the ON state and the anti-shake operation is not performed, the movable unit 30a is fixed to a predetermined position. In this embodiment, the predetermined position is at the center of the range of movement.

The driving of the movable unit 30a of the anti-shake apparatus 30, including movement to a fixed predetermined position, is performed by the electro-magnetic force of the coil unit for driving and the magnet unit for driving, through the driver circuit 29 which has the first PWM duty dx input from the PWM 0 of the CPU 21 and has the second PWM duty dy input from the PWM 1 of the CPU 21.

The detected-position P of the movable unit 30a, either before or after the movement caused by the driver circuit 29, is detected by the hall element unit 44a and the hall-element signal-processing unit 45.

Information regarding the first coordinate of the detected-position P in the first direction x, in other words a first detected-position signal px, is input to the A/D converter A/D 2 of the CPU 21. The first detected-position signal px is an analog signal, and is converted to a digital signal through the A/D converter A/D 2 (A/D conversion operation). The first coordinate of the detected-position P in the first direction x, after the A/D conversion operation, is defined as pdx, corresponding to the first detected-position signal px.

Information regarding the second coordinate of the detected-position P in the second direction y, in other words a second detected-position signal py, is input to the A/D converter A/D 3 of the CPU 21. The second detected-position signal py is an analog signal, and is converted to a digital signal through the A/D converter A/D 3 (A/D conversion operation). The second coordinate of the detected-position P in the second direction y, after the A/D conversion operation, is defined as pdy, corresponding to the second detected-position signal py.

The PID (Proportional Integral Differential) control is performed on the basis of the data for the detected-position P (pdx, pdy) and the position S (sx, sy) following movement.

Driving the movable unit 30a to the position S corresponding to the anti-shake operation of the PID control, is performed when the photographing apparatus 1 is in the anti-shake mode (IS=1) where the anti-shake switch 14a is set to the ON state.

When the anti-shake parameter IS is 0, the PID control that does not correspond to the anti-shake operation is performed so that the movable unit 30a is moved to the center of the range of movement (the predetermined position).

The movable unit 30a has a coil unit for driving that is comprised of a first driving coil 31a and a second driving coil 32a, an imaging unit 39a that has the imaging device, and a hall element unit 44a as a magnetic-field change-detecting element unit.

The fixed unit 30b has a magnet unit for driving that is comprised of a first position-detecting and driving magnet 411b and a second position-detecting and driving magnet 412b, a first position-detecting and driving yoke 431b, and a second position-detecting and driving yoke 432b.

The fixed unit 30b movably supports the movable unit 30a in the first direction x and in the second direction y.

When the center area of the imaging device is on the optical axis LX of the camera lens 67, the relationship between the position of the movable unit 30a and the position of the fixed unit 30b is arranged so that the movable unit 30a is positioned at the center of its range of movement in both the first direction x and the second direction y, in order to utilize the full size of the imaging range of the imaging device.

A rectangle shape, which forms the imaging surface of the imaging device, has two diagonal lines. In this embodiment, the center of the imaging device is the intersection of these two diagonal lines.

The first driving coil 31a, the second driving coil 32a, and the hall element unit 44a are attached to the movable unit 30a.

The first driving coil 31a forms a seat and a spiral shaped coil pattern. The coil pattern of the first driving coil 31a has lines which are parallel to the second direction y, thus creating the first electro-magnetic force to move the movable unit 30a, which includes the first driving coil 31a, in the first direction x.

The first electro-magnetic force occurs on the basis of the current direction of the first driving coil 31a and the magnetic-field direction of the first position-detecting and driving magnet 411b.

The second driving coil 32a forms a seat and a spiral shaped coil pattern. The coil pattern of the second driving coil 32a has lines which are parallel to the first direction x, thus creating the second electro-magnetic force to move the movable unit 30a, which includes the second driving coil 32a, in the second direction y.

The second electro-magnetic force occurs on the basis of the current direction of the second driving coil 32a and the magnetic-field direction of the second position-detecting and driving magnet 412b.

The first and second driving coils 31a and 32a are connected to the driver circuit 29 which drives the first and second driving coils 31a and 32a through the flexible circuit board (not depicted). The first PWM duty dx is input to the driver circuit 29 from the PWM 0 of the CPU 21, and the second PWM duty dy is input to the driver circuit 29 from the PWM 1 of the CPU 21. The driver circuit 29 supplies power to the first driving coil 31a corresponding to the value of the first PWM duty dx, and to the second driving coil 32a corresponding to the value of the second PWM duty dy, to drive the movable unit 30a.

The first position-detecting and driving magnet 411b is attached to the movable unit side of the fixed unit 30b, where the first position-detecting and driving magnet 411b faces the first driving coil 31a and the horizontal hall element hh10 in the third direction z.

The second position-detecting and driving magnet 412b is attached to the movable unit side of the fixed unit 30b, where the second position-detecting and driving magnet 412b faces the second driving coil 32a and the vertical hall element hv10 in the third direction z.

The first position-detecting and driving magnet 411b is attached to the first position-detecting and driving yoke 431b, under the condition where the N pole and S pole are arranged in the first direction x. The first position-detecting and driving yoke 431b is attached to the fixed unit 30b, on the side of the movable unit 30a, in the third direction z.

The second position-detecting and driving magnet 412b is attached to the second position-detecting and driving yoke 432b, under the condition where the N pole and S pole are arranged in the second direction y. The second position-detecting and driving yoke 432b is attached to the fixed unit 30b, on the side of the movable unit 30a, in the third direction z.

The first and second position-detecting and driving yokes 431b, 432b are made of a soft magnetic material.

The first position-detecting and driving yoke 431b prevents the magnetic-field of the first position-detecting and driving magnet 411b from dissipating to the surroundings, and raises the magnetic-flux density between the first position-detecting and driving magnet 411b and the first driving coil 31a, and between the first position-detecting and driving magnet 411b and the horizontal hall element hh10.

The second position-detecting and driving yoke 432b prevents the magnetic-field of the second position-detecting and driving magnet 412b from dissipating to the surroundings, and raises the magnetic-flux density between the second position-detecting and driving magnet 412b and the second driving coil 32a, and between the second position-detecting and driving magnet 412b and the vertical hall element hv10.

The hall element unit 44a is a single-axis unit that contains two magnetoelectric converting elements (magnetic-field change-detecting elements) utilizing the Hall Effect to detect the first detected-position signal px and the second detected-position signal py specifying the first coordinate in the first direction x and the second coordinate in the second direction y, respectively, of the present position P of the movable unit 30a.

One of the two hall elements is a horizontal hall element hh10 for detecting the first coordinate of the position P of the movable unit 30a in the first direction x, and the other is a vertical hall element hv10 for detecting the second coordinate of the position P of the movable unit 30a in the second direction y.

The horizontal hall element hh10 is attached to the movable unit 30a, where the horizontal hall element hh10 faces the first position-detecting and driving magnet 411b of the fixed unit 30b in the third direction z.

The vertical hall element hv10 is attached to the movable unit 30a, where the vertical hall element hv10 faces the second position-detecting and driving magnet 412b of the fixed unit 30b in the third direction z.

When the center of the imaging device intersects the optical axis LX, it is desirable to have the horizontal hall element hh10 positioned on the hall element unit 44a facing an intermediate area between the N pole and S pole of the first position-detecting and driving magnet 411*b* in the first direction x, as viewed from the third direction z. In this position, the horizontal hall element hh10 utilizes the maximum range in which an accurate position-detecting operation can be performed based on the linear output-change (linearity) of the single-axis hall element.

Similarly, when the center of the imaging device intersects the optical axis LX, it is desirable to have the vertical hall element hv10 positioned on the hall element unit 44*a* facing an intermediate area between the N pole and S pole of the second position-detecting and driving magnet 412*b* in the second direction y, as viewed from the third direction z.

The hall-element signal-processing unit 45 has a first hall-element signal-processing circuit 450 and a second hall-element signal-processing circuit 460.

The first hall-element signal-processing circuit 450 detects a horizontal potential-difference x10 between the output terminals of the horizontal hall element hh10 that is based on an output signal of the horizontal hall element hh10.

The first hall-element signal-processing circuit 450 outputs the first detected-position signal px, which specifies the first coordinate of the position P of the movable unit 30*a* in the first direction x, to the A/D converter A/D 2 of the CPU 21, on the basis of the horizontal potential-difference x10.

The second hall-element signal-processing circuit 460 detects a vertical potential-difference y10 between the output terminals of the vertical hall element hv10 that is based on an output signal of the vertical hall element hv10.

The second hall-element signal-processing circuit 460 outputs the second detected-position signal py, which specifies the second coordinate of the position P of the movable unit 30*a* in the second direction y, to the A/D converter A/D 3 of the CPU 21, on the basis of the vertical potential-difference y10.

Figure 6:
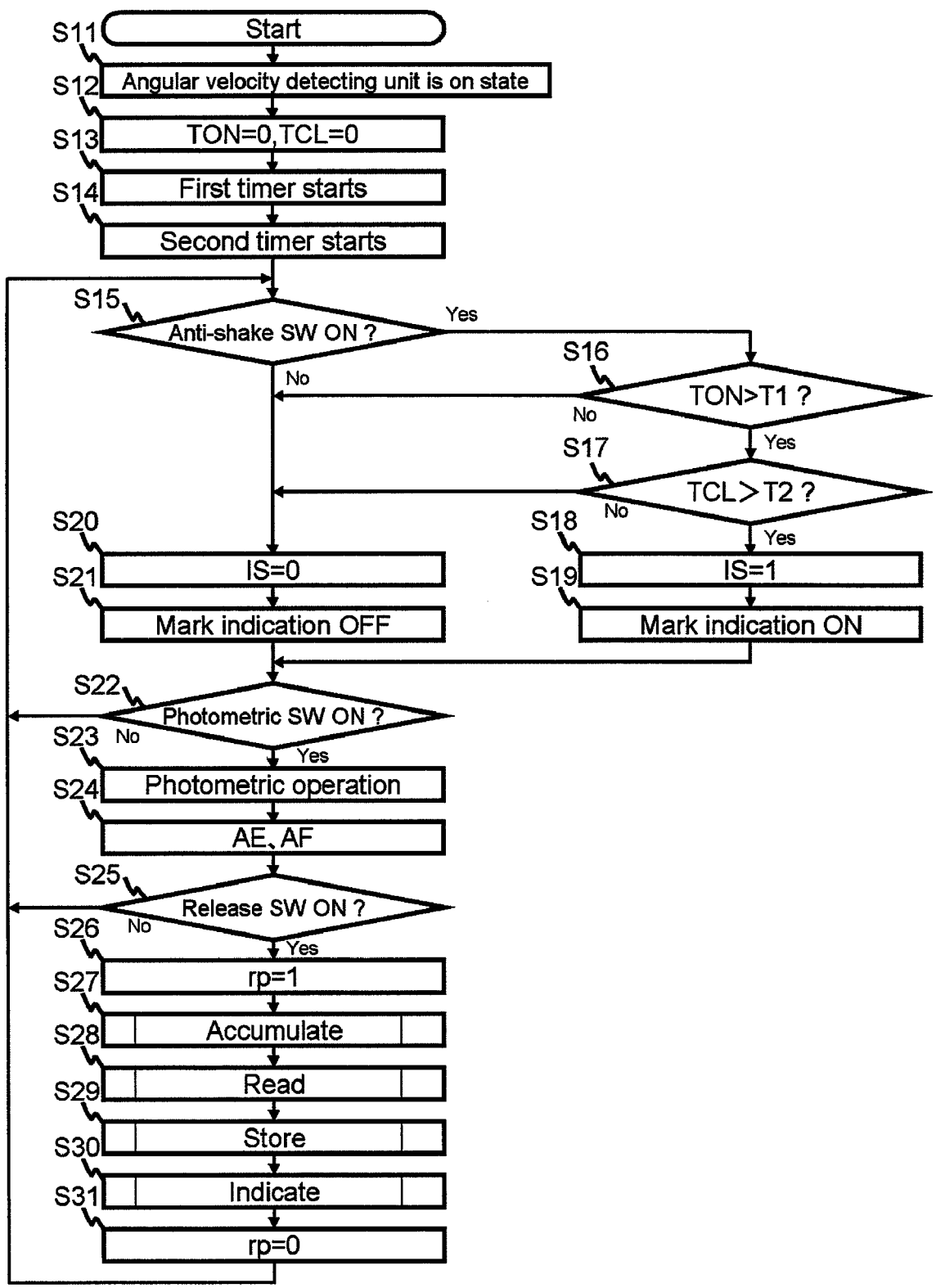
FIG. 6 is a flowchart that shows the flow of the main operation of the photographing apparatus including the photographing operation.

Next, the main operation of the photographing apparatus 1, including the photographing operation, is explained by using the flowchart in FIG. 6.

When the photographing apparatus 1 is set to the ON state, the electrical power is supplied to the angular velocity detection unit 25 so that the angular velocity detection unit 25 is set to the ON state in step S11.

In step S12, the value of the first elapsed time counter TON and the value of the second elapsed time counter TCL are initialized (are set to 0).

In step S13, an interruption process of a first timer commences. The detail of the interruption process of the first timer is explained later by using the flowchart in FIG. 7.

In step S14, an interruption process of a second timer commences. The detail of the interruption process of the second timer is explained later by using the flowchart in FIG. 8.

In step S15, it is determined whether the anti-shake switch 14*a* is set to the ON state. When it is determined that the anti-shake switch 14*a* is not set to the ON state, the operation proceeds directly to step S20. Otherwise, the operation continues on to step S16.

In step S16, it is determined whether the value of the first elapsed time counter TON is greater than the value of the first time T1. When the value of the first elapsed time counter TON is not greater than the value of the first time T1, the operation proceeds directly to step S20. Otherwise, the operation continues on to step S17.

In step S17, it is determined whether the value of the second elapsed time counter TCL is greater than the value of the second time T2. When the value of the second elapsed time counter TCL is not greater than the value of the second time T2, the operation proceeds directly to step S20. Otherwise, the operation continues on to step S18.

In step S18, the value of the anti-shake parameter IS is set to 1. In step S19, the anti-shake operation state display mark, which shows the symbol of a human hand, is indicated in the anti-shake operation state display area 18*b* of the finder display 18, and the anti-shake operation is performed.

In step S20, the value of the anti-shake parameter IS is set to 0. In step S21, the indication state of the anti-shake operation state display mark in the anti-shake operation state display area 18*b* of the finder display 18 is set to OFF state.

Specifically, in the case when the anti-shake operation state display mark is indicated immediately prior to step S21, the indicated anti-shake operation state display mark is turned off.

In the case when the anti-shake operation state display mark is not indicated immediately prior to step S21, the anti-shake operation state display mark remains in the off state.

In step S22, it is determined whether the photometric switch 12*a* is set to the ON state. When it is determined that the photometric switch 12*a* is not set to the ON state, the operation returns to step S15 and the process in steps S15 to S21 is repeated. However, when the photometric switch 12*a* is set to the ON state, the AE sensor of the AE unit 23 is driven, the photometric operation is performed, and the aperture value and exposure time are calculated in step S23. Further, in step S23, the AF sensor and lens control circuit of the AF unit 24 is driven to perform the AF sensing and focus operations, respectively.

Further, calculating the hand-shake quantity commences by the interruption operation of the second timer immediately after the photometric switch 12*a* is set to the ON state.

In step S25, it is determined whether the release switch 13*a* is set to the ON state. When the release switch 13*a* is not set to the ON state, the operation returns to step S15 and the process in steps S15 to S24 is repeated. Otherwise, the operation continues on to step S26, where the value of the release SW parameter rp is set to 1.

In step S27, the exposure operation, or in other words the electric charge accumulation of the imaging device (CCD etc.), is performed. After the exposure time has elapsed, the electric charge which has accumulated in the imaging device during the exposure time is read in step S28. In step S29, the electric charge which was read in step S28, is stored in the memory of the photographing apparatus 1 as the image signal imaged by the imaging block 22. In step S30, the stored image signal is displayed on the indicating unit 17.

In step S31, the value of the release SW parameter rp is set to 0, the operation returns to step S15 and the process in steps S15 to S31 is repeated.

Figure 7:
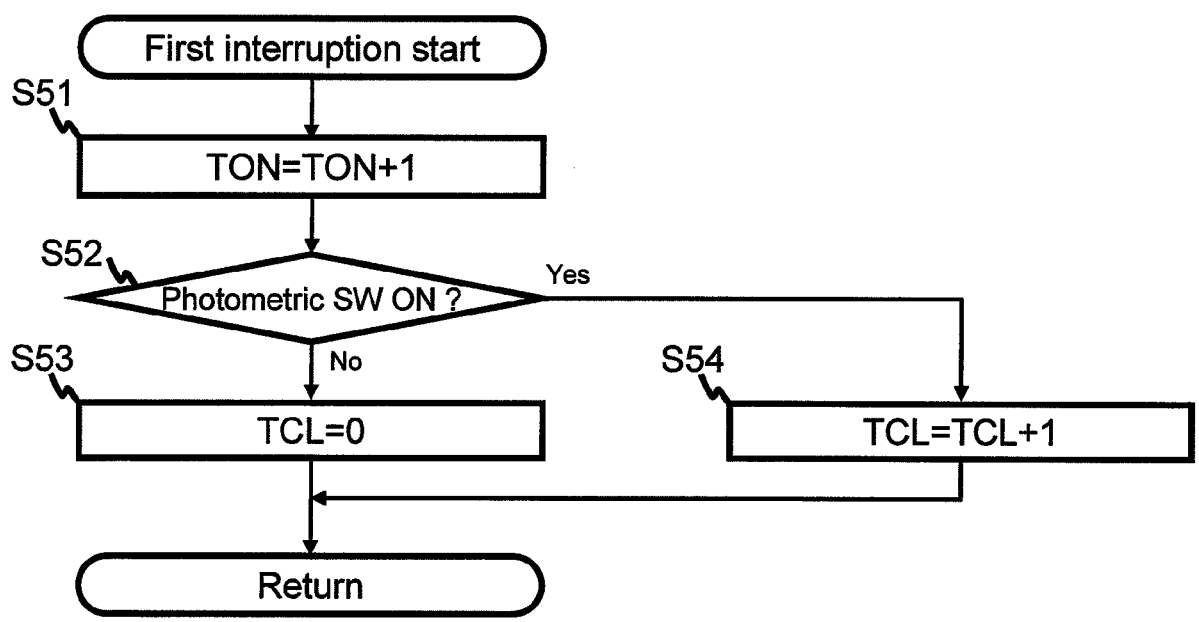
FIG. 7 is a flowchart that shows the interruption process of the first timer.

Next, the elapsed time counting operation for the first elapsed time counter TON and the second elapsed time counter TCL, which is performed at every predetermined time interval (1 ms) as an interruption process that is independent of the other operations, is explained by using the flowchart in FIG. 7.

When the interruption process of the first timer commences, 1 is added to the value of the first elapsed time counter TON in step S51.

In step S52, it is determined whether the photometric switch 12*a* is set to the ON state. When it is determined that the photometric switch 12*a* is not set to the ON state, the value of the second elapsed time counter TCL is set to 0, in step S53. When it is determined that the photometric switch 12*a* is set to the ON state, 1 is added to the value of the second elapsed time counter TCL in step S54.

Figure 8:
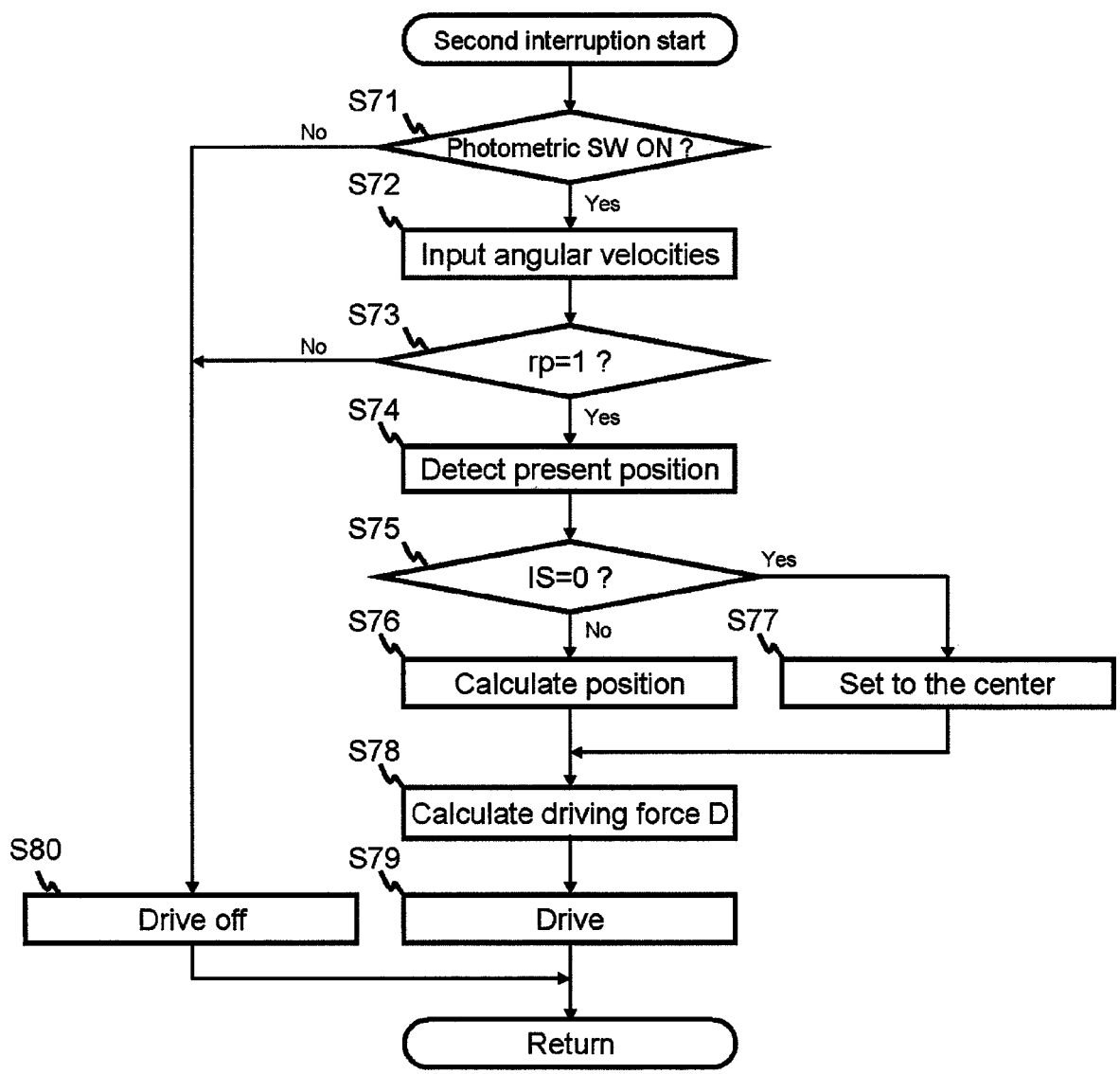
FIG. 8 is a flowchart that shows the interruption process of the second timer

Next, the anti-shake operation, which is performed at every predetermined time interval (1 ms) as an interruption process independent of the other operations, is explained by using the flowchart in FIG. 8.

The interruption process of the second timer for the anti-shake operation commences. In step S71, it is determined whether the photometric switch 12a is set to the ON state. When it is determined that the photometric switch 12a is not set to the ON state, the operation proceeds directly to step S80, where the driving operation for the first and second driving coils 31a and 32a is set to the OFF state, so that the movable unit 30a is not driven. When it is determined that the photometric switch 12a is set to the ON state, the operation continues on to step S72.

In step S72, the first angular velocity vx, which is output from the angular velocity detection unit 25, is input to the A/D converter A/D 0 of the CPU 21 and converted to a digital signal. The second angular velocity vy, which is also output from the angular velocity detection unit 25, is input to the A/D converter A/D 1 of the CPU 21 and converted to a digital signal.

In step S73, it is determined whether the value of the release SW parameter rp is set to 1, or in other words, whether the release switch 13a is set to the ON state. When the value of the release SW parameter rp is not set to 1, the operation proceeds directly to step S80, otherwise, the operation continues on to step S74.

In step S74, the hall element unit 44a detects the position of the movable unit 30a, and the first and second detected-position signals px and py are calculated by the hall-element signal-processing unit 45. The first detected-position signal px is then input to the A/D converter A/D 2 of the CPU 21 and converted to a digital signal (PDX), whereas the second detected-position signal py is input to the A/D converter A/D 3 of the CPU 21 and also converted to a digital signal (PDY), both of which thus determine the present position P (pdx, pdy) of the movable unit 30a.

In step S75, it is determined whether the value of the anti-shake parameter IS is 0. When it is determined that the value of the anti-shake parameter IS is 0 (IS=0), in other words when the photographing apparatus is not in anti-shake mode, the position S (sx, sy) where the movable unit 30a (the imaging unit 39a) should be moved, is set at the center of the range of movement of the movable unit 30a, in step S77. When it is determined that the value of the anti-shake parameter IS is not 0 (IS=1), in other words when the photographing apparatus is in anti-shake mode, the position S (sx, sy) where the movable unit 30a (the imaging unit 39a) should be moved, is calculated on the basis of the first and second angular velocities vx and vy, in step S76.

In step S78, the first PWM duty dx and the second PWM duty dy of the driving force D, which moves the movable unit 30a to the position S, are calculated on the basis of the position S (sx, sy) that was determined in step S76 or step S77, and the present position P (pdx, pdy).

In step S79, the first driving coil unit 31a is driven by using the first PWM duty dx through the driver circuit 29, and the second driving coil unit 32a is driven by using the second PWM duty dy through the driver circuit 29, so that the movable unit 30a is moved to position S (sx, sy).

The process of steps S78 and S79 is an automatic control calculation, which is used with the PID automatic control for performing general (normal) proportional, integral, and differential calculations.

In the case that the electrical power supplied to the angular velocity detection unit 25 and the angular velocity detection unit 25 is set to the ON state, a charge is applied to the first high-pass filter circuit 27a and the second high-pass filter circuit 27b.

Before starting the charge, the electric potential at point B in FIG. 5 is equal to GND. After completion of the charge, the electric potential at point B in FIG. 5 becomes a constant value that is the reference voltage Vref.

However, during charging the electric potential at point B in FIG. 5 is not constant as it changes from GND to the reference voltage Vref.

During this variable state of the electric potential at point B, the detection of the angular velocity cannot be performed accurately.

Figure 9:
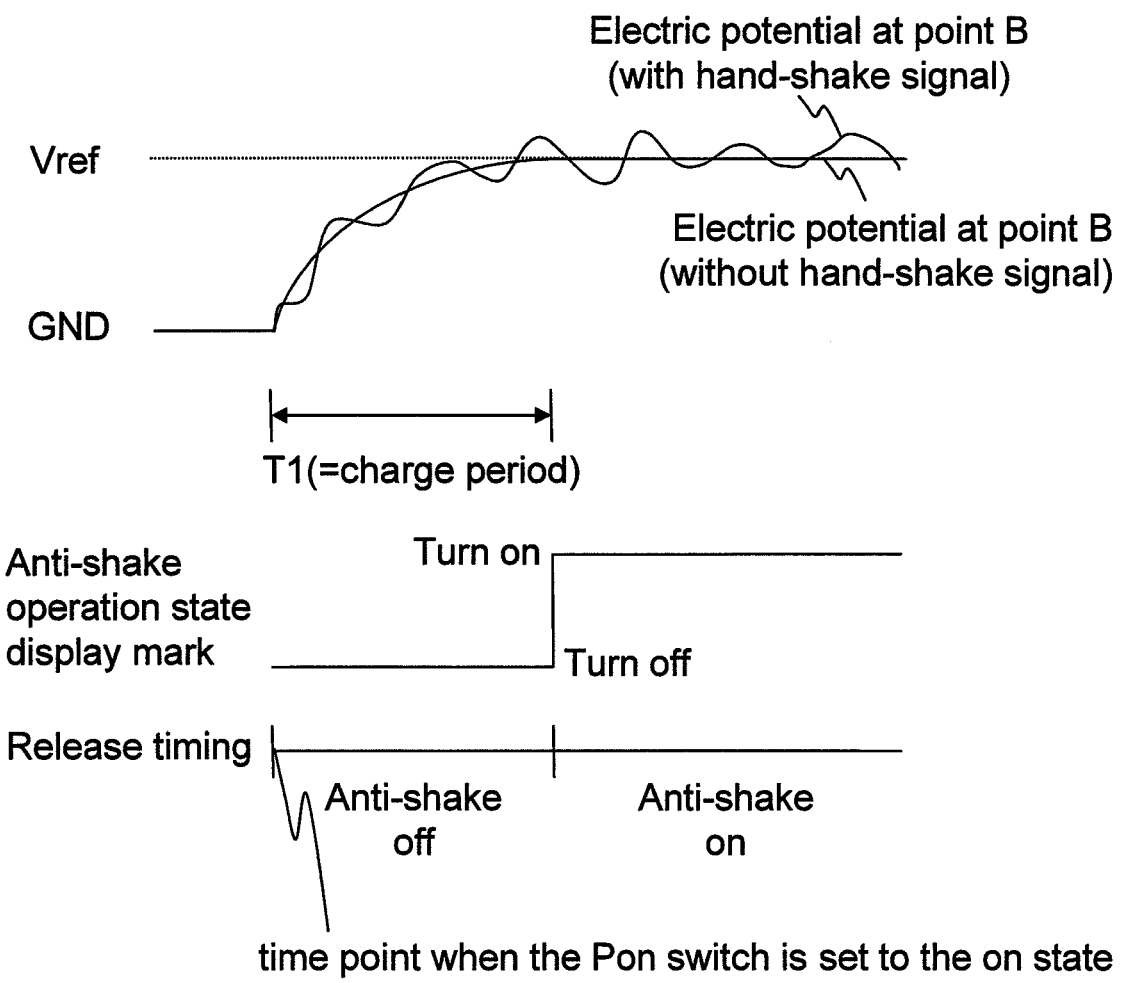
FIG. 9 is a figure that shows a state where calculating the hand-shake quantity cannot be performed accurately in the first time.

The length of the charging period is determined based on the resistor R1 (R2) and the time constant of the condenser C1 (C2), and is equal to approximately 2 seconds (see FIG. 9).

In the present embodiment, the length of the charging period is set to the first time T1. Further, an elapsed time from when the main power supply of the photographing apparatus 1 is set to the ON state is counted by using the first elapsed time counter TON, so that the anti-shake operation is not performed until the first elapsed time counter TON is equal to or greater than the first time T1, even if the anti-shake switch 14a is set to the ON state.

When it is necessary to perform the photographing operation immediately upon setting the main power supply of the photographing apparatus 1 to the ON state, the photographing operation is performed without the anti-shake operation during the interval from the point when the main power supply is set to the ON state until the point when the first elapsed time counter TON reaches the first time T1.

Figure 10:
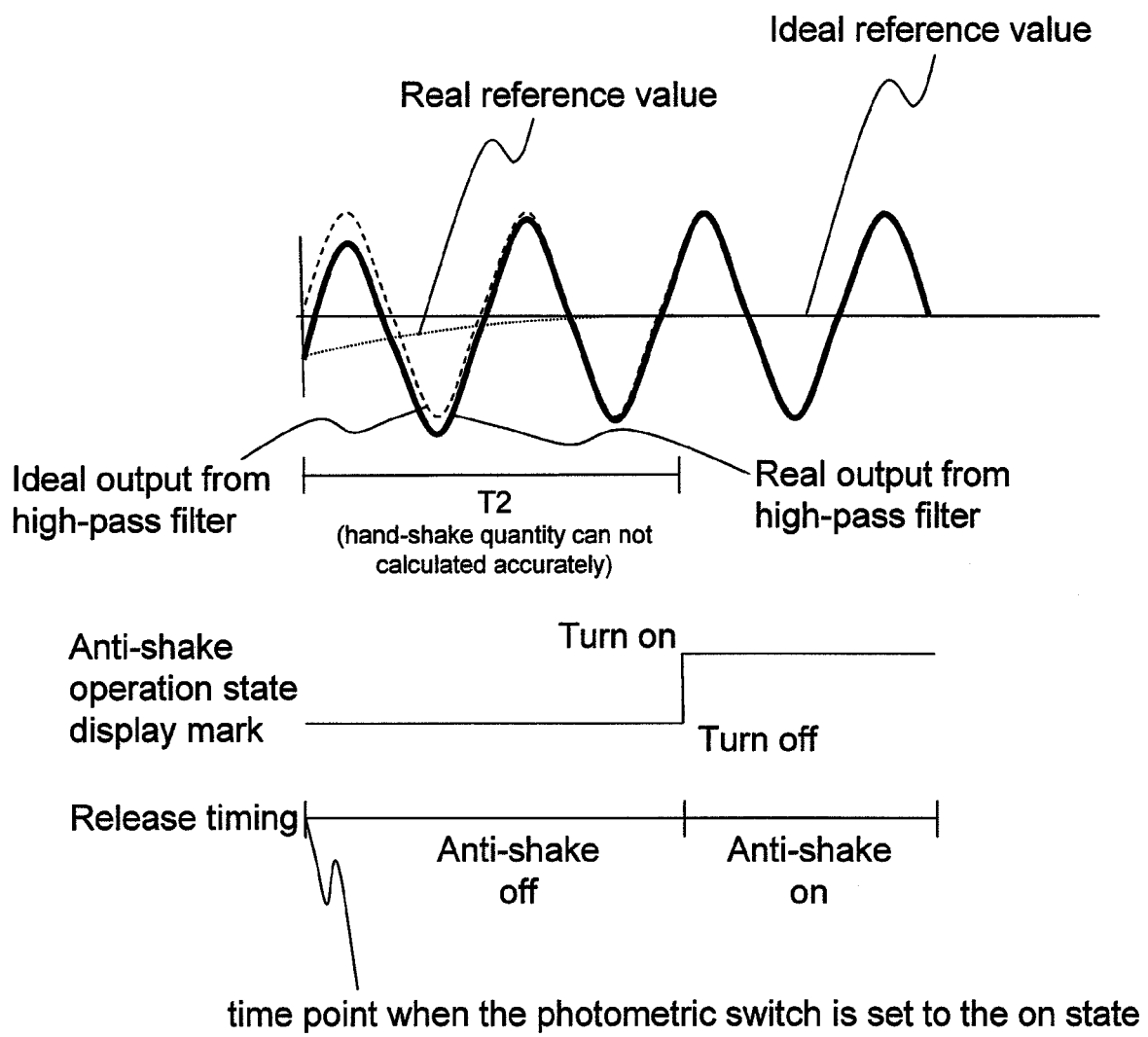
FIG. 10 is a figure that shows a state where calculating the hand-shake quantity cannot be performed accurately in the second time.

Further, in the initial period of the second time T2, immediately after the first angular velocity sensor 26a, the second angular velocity sensor 26b, the first high-pass filter circuit 27a, and the second high-pass filter circuit 27b, start calculating the hand-shake quantity, an accurate result cannot be obtained due to the occurrence of a drift effect (see FIG. 10).

The broken line in FIG. 10 shows an ideal output wave form from the first high-pass filter circuit 27a, when the first angular velocity sensor 26a detects a hand-shake consisting of only a sine wave. The ideal output wave form is equal to the sine wave that is detected by the first angular velocity sensor 26a.

However, because the drift effect occurs during the second time T2, a variance develops between a real reference value for the high-pass filter operation of the first high-pass filter circuit 27a and an ideal reference value for the high-pass filter operation of the first high-pass filter circuit 27a.

The real reference value is variable until the second time T2 has elapsed, and is constant after the second time T2 has elapsed (see the dotted ling in FIG. 10).

The ideal reference value is constant (see the thin solid line (reference line) in FIG. 10).

Therefore, the variance between the real output wave form from the first high-pass filter circuit 27a (see the thick solid line in FIG. 10) and the ideal output wave form from the first high-pass filter circuit 27a (see the broken line in FIG. 10) occurs during the second time T2.

The hand-shake quantity cannot be calculated accurately in the initial period until the variance between the real reference value and the ideal reference value has converged.

The length of the second time T2 is determined based on the time constant of the high-pass filter used for calculating the hand-shake quantity, and is equal to approximately 0.5 seconds.

In the present embodiment, an elapsed time from when the photometric switch 12a is set to the ON state, in other words from the start of the calculation of the hand-shake quantity by the first angular velocity sensor 26a, the second angular velocity sensor 26b, the first high-pass filter circuit 27a, and the second high-pass filter circuit 27b, until the second time T2 has elapsed, is counted by using the second elapsed time counter TCL so that the start of the anti-shake operation is delayed until the second elapsed time counter TCL reaches the second time T2, even if the anti-shake switch 14a is set to the ON state.

However, because certain situations require performing the photographing operation immediately after the photometric switch 12a is set to the ON state, the photographing operation is performed without the anti-shake operation from the point when the photometric switch 12a is set to the ON state until the second elapsed time counter TCL reaches the second time T2.

In the present embodiment, the first elapsed time counter TON and the second elapsed time counter TCL are both counted so that the photographing operation is performed without the anti-shake operation during the period when the hand-shake quantity cannot be calculated accurately, regardless of whether the anti-shake switch 14a is set to the ON state or the OFF state. Therefore, an inaccurate anti-shake operation does not affect the photographing result. Further, in a scenario where performing the photographing operation is necessary immediately after the main power supply is set to the ON state, the photographing operation can be performed timely, corresponding to a sudden shutter chance.

Whether or not the anti-shake operation is performed is discernible by the presence or absence of the anti-shake operation state display mark in the anti-shake operation state display area 18b of the finder display 18. Therefore, by observing the finder display 18, the user of the photographing apparatus 1 can recognize when the anti-shake operation is not performed, regardless of the user's optional ON/OFF control of the anti-shake switch 14a.

In this embodiment, it is explained that the movable unit 30a has the imaging device. However, the movable unit 30a may have a hand-shake correcting lens instead of the imaging device.

Further, it is explained that the hall element is used for position detection as the magnetic-field change-detecting element. However, another detection element, an MI (Magnetic Impedance) sensor such as a high-frequency carrier-type magnetic-field sensor, a magnetic resonance-type magnetic-field detecting element, or an MR (Magneto-Resistance effect) element may be used for position detection purposes. When one of either the MI sensor, the magnetic resonance-type magnetic-field detecting element, or the MR element is used, the information regarding the position of the movable unit can be obtained by detecting the magnetic-field change, similar to using the hall element.

Further, in the present embodiment, after the main power supply is set to the ON state, the ON/OFF state of the anti-shake operation changes corresponding to the value of the first elapsed time counter TON etc.

Therefore, when using a photographing apparatus capable of displaying a through image (a live view function), the user may become irritated observing the through image while the ON/OFF state of the anti-shake operation changes. Accordingly, it is desirable that the photographing apparatus 1 in the present embodiment has a shutter mechanism such as a focal-plane shutter. In this arrangement, the exposure operation of the imaging device is only performed when the release switch 13a is set to the ON state and the shutter mechanism is open, so that the through image does not appear on the display 17.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2006-140536 (filed on May 19, 2006), which is expressly incorporated herein by reference, in its entirety.

The invention claimed is:

1. An anti-shake apparatus of a photographing apparatus, comprising:
 a photometric switch that is manipulated to perform a photometric operation;
 a release switch that is manipulated to perform a photographing operation;
 a controller that performs said photographing operation without an anti-shake operation when said release switch is set to an ON state and when it is determined that either a first elapsed time from a time when a main power supply is set to an ON state does not exceed a first time, or a second elapsed time from a time when the photometric switch is set to a ON state for said photometric operation does not exceed a second time;
 an angular velocity sensor that is used to calculate a hand-shake quantity for said anti-shake operation; and
 a high-pass filter that reduces a low frequency component of an output from said angular velocity sensor, said first time being equal to a length of a charging period of said high-pass filter, said second time being equal to an interval preceding a convergence of a variance between a real reference value for a high-pass filter operation of said high-pass filter and an ideal reference value for the high-pass filter operation of said high-pass filter, an occurrence of the variance being based on a drift effect.

2. The anti-shake apparatus of claim 1, wherein electrical power is supplied to said angular velocity sensor and said high-pass filter after said main power supply is set to the ON state,
 calculation of said hand-shake quantity commences after said photometric switch is set to the ON state; and
 said anti-shake operation based on calculation of said hand-shake quantity commences after said release switch is set to the ON state.

3. The anti-shake apparatus of claim 1, further comprising:
 a finder that has a finder display,
 wherein a photographic subject image can be optically observed by said finder, and
 wherein said controller indicates a state of said anti-shake operation on said finder display.

4. The anti-shake apparatus of claim 1, further comprising:
 a mover that has a movable area on an xy plane that is perpendicular to an optical axis of a camera lens of said photographing apparatus,
 said mover being fixed to a center of a range of movement of said mover when said photographing operation is performed without said anti-shake operation.

5. The anti-shake apparatus of claim 1, further comprising:
 an anti-shake switch that is used for ON/OFF control of said anti-shake operation,
 said controller performing said photographing operation without said anti-shake operation when said release switch is set to the ON state and it is determined that either said first elapsed time does not exceed said first time, or said second elapsed time does not exceed said second time, even if said anti-shake switch is set to the ON state.

6. A photographing apparatus, comprising:

a shutter mechanism that is open during a time of exposure for a photographing operation;

a finder;

an anti-shake apparatus that has a photometric switch, a release switch, and a controller that performs said photographing operation without an anti-shake operation when said release switch is set to an ON state, and it is determined that either a first elapsed time from a time when a main power supply is set to an ON state does not exceed a first time, or a second elapsed time from a time when said photometric switch is set to an ON state does not exceed a second time;

an angular velocity sensor that is used to calculate a hand-shake quantity for said anti-shake operation; and a high-pass filter that reduces a low frequency component of an output from said angular velocity sensor, said first time being equal to a length of a charging period of said high-pass filter, said second time being equal to an interval preceding a convergence of a variance between a real reference value for a high-pass filter operation of said high-pass filter and an ideal reference value for the high-pass filter operation of said high-pass filter, an occurrence of the variance being based on a drift effect, wherein a photographic subject image can be optically observed by said finder.

* * * * *